US006868456B2

(12) United States Patent
Kim

(10) Patent No.: US 6,868,456 B2
(45) Date of Patent: Mar. 15, 2005

(54) UNIVERSAL SERIAL BUS DEVICE INITIALIZED WITH A REAL DESCRIPTOR STORED IN HOST AND METHOD FOR INITIALIZING THE SAME

(75) Inventor: Do Hyung Kim, Seoul (KR)

(73) Assignee: MTEK Vision Co., Ltd. (KR)

( * ) Notice: Subject to any disclaimer, the term of this patent is extended or adjusted under 35 U.S.C. 154(b) by 473 days.

(21) Appl. No.: 10/054,289

(22) Filed: Nov. 12, 2001

(65) Prior Publication Data

US 2003/0037197 A1 Feb. 20, 2003

(30) Foreign Application Priority Data

Aug. 20, 2001 (KR) .............................. 10-2001-0049861

(51) Int. Cl.[7] .............................................. G06F 3/00
(52) U.S. Cl. ........................................ 710/10; 710/305
(58) Field of Search ............................ 710/8, 10, 302, 710/305, 306, 311, 220

(56) References Cited

U.S. PATENT DOCUMENTS 6,009,480 A * 12/1999 Pleso .............................. 710/8
6,088,785 A * 7/2000 Hudson et al. ................ 712/35
6,490,637 B1 * 12/2002 Shih .............................. 710/8
6,523,081 B1 * 2/2003 Karlsson et al. ............ 710/305

* cited by examiner

*Primary Examiner*—Khanh Dang
(74) *Attorney, Agent, or Firm*—Cantor Colburn LLP

(57) ABSTRACT

A universal serial bus (USB) device and an initializing method therefor. The USB device includes an interface, at least one signal line and a voltage regulator. The interface stores a basic descriptor. The interface primarily activates an initialization signal and transfers the basic descriptor to a host to perform a primary initialization. Further, the interface downloads a real descriptor stored in the host in response to a download command generated from the host, and secondarily activates the initialization signal and transfers the real descriptor to the host to perform a secondary initialization. The signal line guides the basic descriptor, the real descriptor and the download command. The voltage regulator pulls up the signal line while the initialization signal is activated.

14 Claims, 4 Drawing Sheets

UNIVERSAL SERIAL BUS DEVICE INITIALIZED WITH A REAL DESCRIPTOR STORED IN HOST AND METHOD FOR INITIALIZING THE SAME

BACKGROUND OF THE INVENTION

1. Field of the Invention

The invention relates to a universal serial bus (USB) device, and more particularly, to a USB device to be initialized with a real descriptor stored in a USB host, and a method for initializing the same.

2. Description of the Related Art

A USB device is an interfacing device for connecting peripheral equipments, such as a keyboard, a monitor, a mouse, a printer, a modem, a digital camera, etc., to a USB host. The USB device is initialized to allow the peripheral equipments to communicate with the USB host. Meanwhile, the USB host stores a real descriptor and a descriptor recognizing program to initialize the USB device.

FIG. 1 is a block diagram of a conventional USB device. In the conventional USB device shown in FIG. 1, a descriptor read/write portion 12 of a USB interface 10 reads a descriptor REDES stored in an additional memory 20 and then, transfers the descriptor REDES to a register 14. The transferred descriptor REDES is stored in the register 14. The descriptor REDES includes the information of a real vendor I.D. and a real product I.D. for a USB host 1.

An initialization signal generator 18 in the USB interface 10 activates an initialization signal XINT, and a voltage regulator 30 pulls up a signal line 40, in response to the initialization signal XINT. That is, a transistor 32 in the voltage regulator 30 is turned on, and then a terminal voltage $V_{DD}$ is transferred to the signal line 40 through a resistor 34.

The descriptor read/write portion 12 reads the descriptor REDES stored in the register 14 at need, and provides the descriptor REDES to the USB host 1 through a USB core 16 and the signal line 40. When a descriptor recognizing program 1a of the USB host 1 recognizes the descriptor REDES provided from the USB interface 10, the initialization of the conventional USB device is completed.

Generally, the additional memory 20 is a ROM (Read Only Memory) positioned at an outside of the USB interface 10, so that the descriptor REDES can be changed depending on the USB host 1.

However, the conventional USB device has disadvantages in points of the chip size and the manufacturing cost due to the additional memory 20 positioned at the outside of the USB interface 10.

SUMMARY OF THE INVENTION

In one aspect, there is provided a USB device to be initialized as a state enabling a communication with a host. The host stores a real descriptor and a descriptor recognizing program. The USB device includes an interface, at least one signal line and a voltage regulator. The interface stores a predetermined basic descriptor. The interface primarily activates an initialization signal and transfers the basic descriptor to the host in order to perform a primary initialization. Further, the interface downloads the real descriptor in response to a download command generated from the host, and then secondarily activates the initialization signal and transfers the real descriptor to the host in order to perform a secondary initialization. The signal line guides the basic descriptor, the real descriptor and the download command. The voltage regulator pulls up the signal line while the initialization signal is activated.

In another aspect, a USB device includes at least one signal line and an interface. The signal line is connected to a host. The signal line guides data and commands to the host. The interface stores a predetermined basic descriptor. The interface primarily activates an initialization signal and transfers the basic descriptor to the host in order to perform a primary initialization. Further, the interface downloads a real descriptor in response to a download command generated from the host, and then secondarily activates the initialization signal and transfers the real descriptor to the host in order to perform a secondary initialization. This interface includes a voltage regulator pulling up the signal line while the initialization signal is activated.

In still another aspect, there is provided a method for initializing a USB device connected to a host, which stores a real descriptor and a descriptor recognizing program. The initializing method comprises the steps of (a) performing a primary initialization with a basic descriptor stored in a ROM type memory; (b) receiving the real descriptor and a download command generated from the host; and (c) performing a secondary initialization with the real descriptor.

BRIEF DESCRIPTION OF THE DRAWINGS

The foregoing and further features and advantages of the invention will become more apparent from the following description and the accompanying drawings, in which the same reference numerals indicate the same or corresponding parts.

DESCRIPTION OF THE PREFERRED EMBODIMENTS

Figure 1:
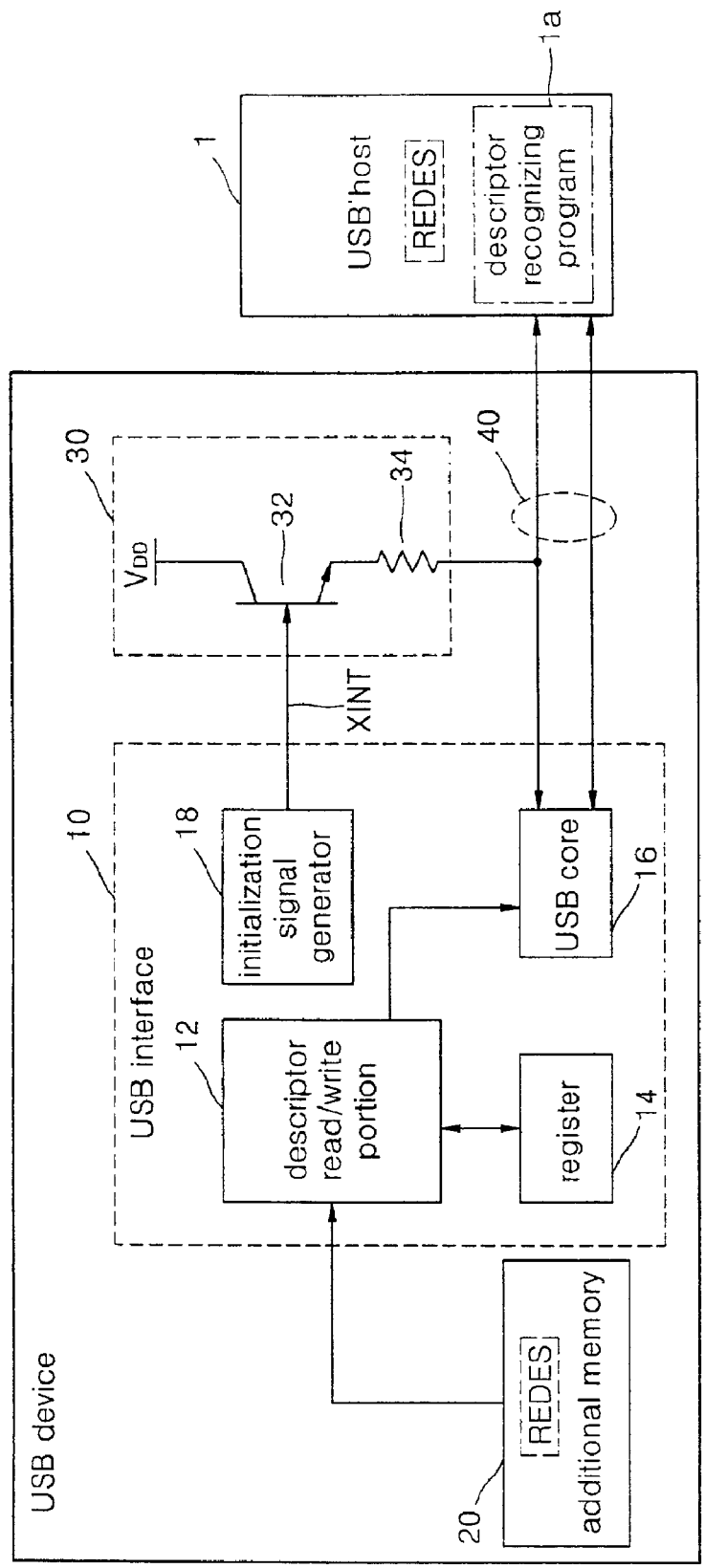
FIG. 1 is a block diagram of a conventional USB device.
Figure 2:
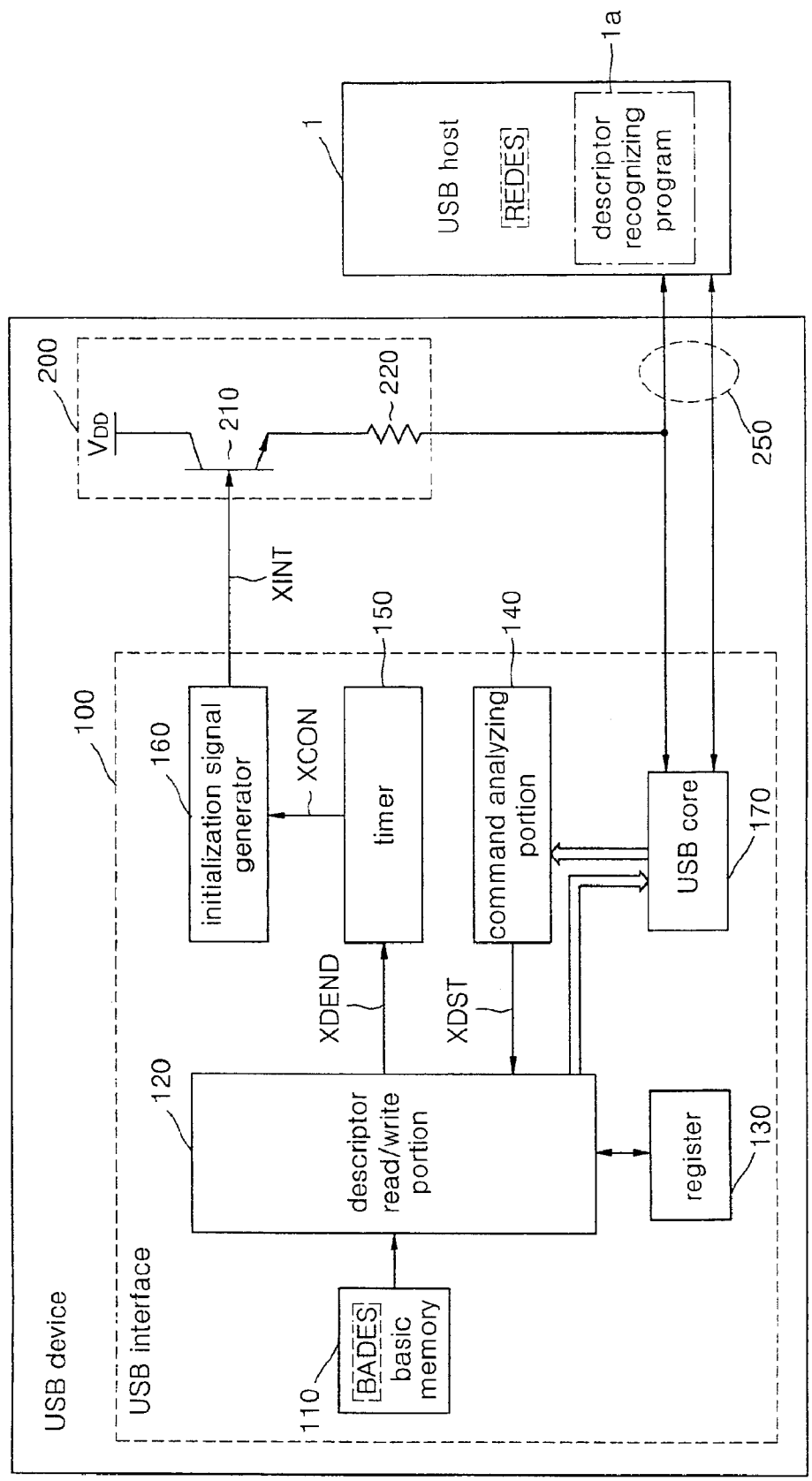
FIG. 2 is a block diagram of a USB device according to one exemplary embodiment of the invention.

FIG. 2 is a block diagram of a USB device according to one exemplary embodiment of the invention. Referring to FIG. 2, the USB device includes a USB interface 100, a voltage regulator 200 and at least one signal ($D^+$ or $D^-$) line 250.

The USB interface 100 has a basic memory 110, a descriptor read/write portion 120, a register 130, a command analyzing portion 140, a timer 150, an initialization signal generator 160 and a USB core 170. The USB interface 100 manages communication on the basis of a USB protocol.

The basic memory 110 stores a basic descriptor BADES. When a ROM (Read Only Memory) is used as the basic memory 110, even if an external power supplied to the USB interface 100 is cut off, the basic memory 110 stores the basic descriptor BADES. The basic descriptor BADES includes a common vendor I.D. and a common product I.D., and can be inputted to the basic memory 110 when the USB device is manufactured. Therefore, the information in the basic descriptor BADES can be different from real information for a USB host 1 connected to the USB device.

The descriptor read/write portion 120 reads the basic descriptor BADES stored in the basic memory 110, when the external power is supplied to the USB interface 100. The descriptor read/write portion 120 transfers the basic descriptor BADES to the USB host 1, when the signal line 250 is primarily pulled up, through the USB core 170 and the signal line 250. In this case, when a descriptor recognizing program 1a of the USB host 1 recognizes the basic descriptor BADES transferred from the USB device, a primary initialization of the USB device is completed. Then, the USB host 1 provides a real descriptor REDES and a download command to the USB core 170, through the signal line 250. The real descriptor REDES includes a real vendor I.D. and a real product I.D. for the USB host 1.

The descriptor read/write portion 120 downloads the real descriptor REDES in response to a download start signal XDST, which instructs a download of the real descriptor REDES, and transfers the real descriptor REDES to the register 130. The descriptor read/write portion 120 activates a download completion signal XDEND, when the download operation is completed. With a predetermined period, the signal line 250 is secondarily pulled up. Then the descriptor read/write portion 120 reads the real descriptor REDES stored in the register 130 and transfers the real descriptor REDES to the USB host 1, through the USB core 170 and the signal line 250.

The register 130 stores the real descriptor REDES transferred from the descriptor read/write portion 120.

The command analyzing portion 140 receives the real descriptor REDES and the download command provided from the USB host 1, and activates the download start signal XDST. Then, the command analyzing portion 140 provides the download start signal XDST and the real descriptor REDES to the descriptor read/write portion 120.

The timer 150 primarily activates a control signal XCON in the form of pulse, in response to the download completion signal XDEND. The timer 150 secondarily activates the control signal XCON with a predetermined period. The control signal XCON controls the initialization signal generator 160. The secondary activation of the control signal XCON is generated before the descriptor read/write portion 120 transfers the real descriptor REDES to the USB host 1.

An initialization signal XINT is primarily activated when the external power voltage is supplied to the USB device. The initialization signal XINT controls the voltage regulator 200. The primary activation of the initialization signal XINT is terminated in response to the primary activation of the control signal XCON, and the initialization signal XINT is secondarily activated in response to the secondary activation of the control signal XCON.

The USB core 170 is connected to the USB host 1 via the signal line 250. The USB core 170 receives the download command and the real descriptor REDES from the USB host 1, and transfers them to the command analyzing portion 140. The USB core 170 receives the basic descriptor BADES and the real descriptor REDES from the descriptor read/write portion 120, and transfers them to the USB host 1 through the signal line 250.

The voltage regulator 200 has a transistor 210 connected to a terminal voltage $V_{DD}$ and a resistor 220. The resistor 220 is positioned between the transistor 210 and the signal line 250. The transistor 210 is turned on while the initialization signal XINT is in the state of the primary or the secondary activation. Then, the voltage regulator 200 supplies the terminal voltage $V_{DD}$ to the signal line 250, and the signal line 250 is pulled up. In this case, the USB device can transfer/receive data, such as the real descriptor REDES, the basic descriptor BADES etc., and the download command to/from the USB host 1 through the signal line 250.

Meanwhile, the voltage regulator 200 is turned off when the initialization signal XINT is terminated. In this case, the signal line 250 is pulled down and the communication between the USB device and the USB host 1 is terminated.

Figure 3:
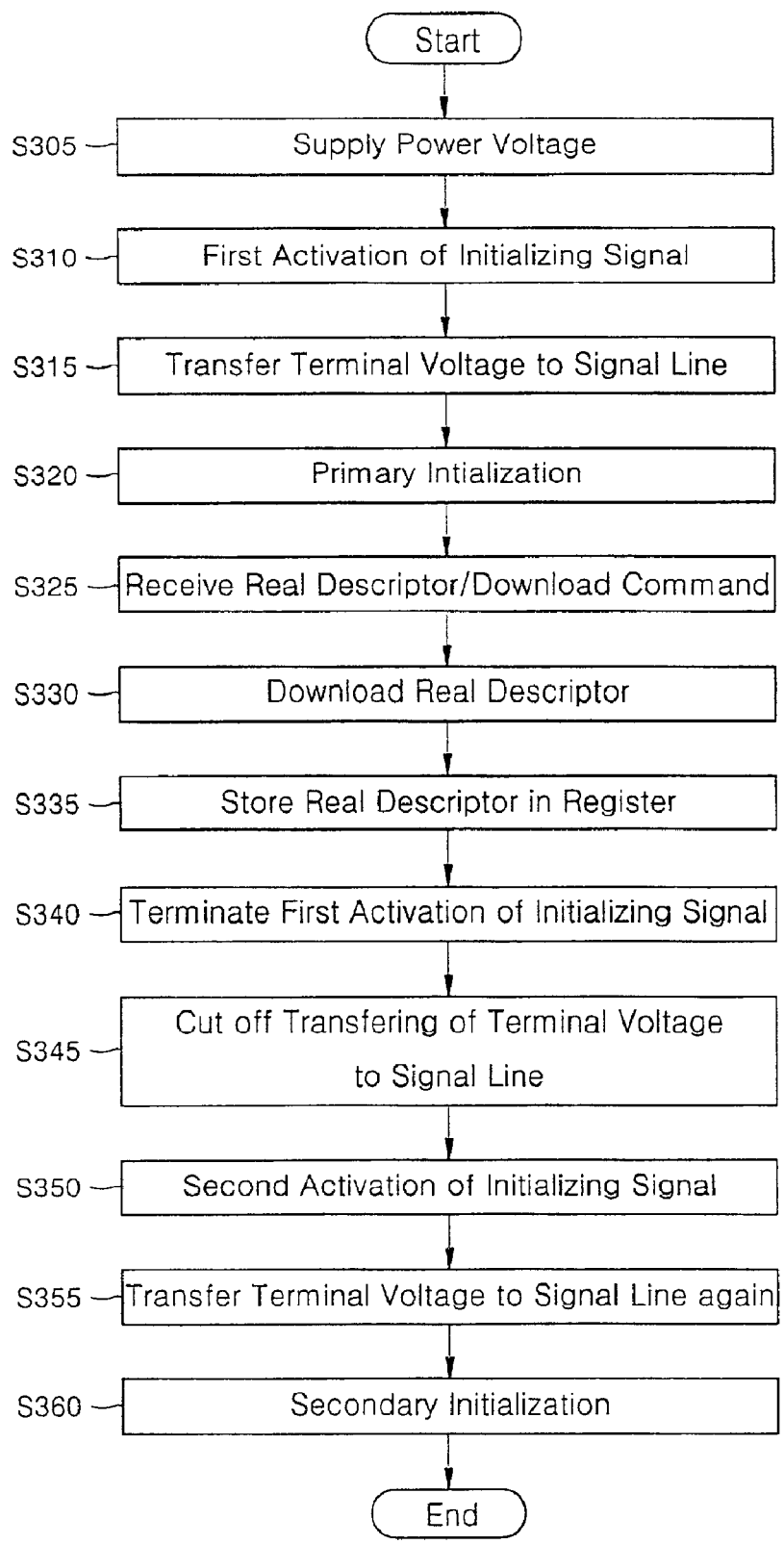
FIG. 3 is a flowchart for explaining a method of initializing the USB device illustrated in FIG. 2.

FIG. 3 is a flowchart for explaining a method of initializing the USB device illustrated in FIG. 2. Referring to FIG. 3, in the method for initializing the USB device, an external power is supplied to the USB device, at step S305. Then, the initialization signal generator 160 primarily activates the initialization signal XINT, at step S310. In this case, the transistor 210 of the voltage regulator 200 is turned on and the terminal voltage $V_{DD}$ is transferred to the signal line 250, at step S315. That is, the signal line 250 is pulled up.

Simultaneously, the descriptor read/write portion 120 reads the basic descriptor BADES stored in the basic memory 110 and transfers the basic descriptor BADES to the USB host 1 through the USB core 170 and the signal line 250, thus the primary initialization is performed, at step S320. When the descriptor recognizing program 1a of the USB host 1 recognizes the basic descriptor BADES, the primary initialization of the USB device is completed. In this state, the USB host 1 provides the real descriptor REDES and the download command to the USB interface 100 through the signal line 250.

In this case, the command analyzing portion 140 receives the real descriptor REDES and the download command through the USB core 170, at step S325. The command analyzing portion 140 generates the download start signal XDST and provides the real descriptor REDES to the descriptor read/write portion 120. Then, the descriptor read/write portion 120 downloads the real descriptor REDES from the command analyzing portion 140 in response to the download start signal XDST, at step S330, and transfers the real descriptor REDES to the register 130, at step S335. Thereafter, the descriptor read/write portion 120 activates the download completion signal XDEND.

In this case, the timer 150 primarily activates the control signal XCON in response to the download completion signal XDEND. Then, the initialization signal generator 160 terminates the primary activation of the initialization signal XINT in response to the primary activation of the control signal XCON, at step S340. The transistor 210 of the voltage regulator is turned off, and the transferring of the terminal voltage $V_{DD}$ to the signal line 250 is cut off, at step S345. Therefore, the communication between the USB host 1 and the USB device is terminated. The USB host 1 ignores the basic descriptor, which is recognized by the descriptor recognizing program 1a during the primary initialization of the initialization signal XINT.

With enough time such that the USB host 1 can completely ignore the basic descriptor, the timer 150 secondarily activates the control signal XCON. Then, the initialization signal generator 160 secondarily activates the initialization signal XINT in response to the secondary activation of the control signal XCON, at step S350. Therefore, the transistor 210 of the voltage regulator 200 is turned on again, and the terminal voltage $V_{DD}$ is transferred to the signal line 250 again, at step S355. That is, the signal line 250 is pulled up again.

Simultaneously, the descriptor read/write portion 120 reads the real descriptor REDES stored in the register 130 and transfers the real descriptor REDES to the USB host 1, thus a secondary initialization of the USB device is performed, at step S360. Then, when the descriptor recognizing program 1a of the USB host 1 recognizes the real descriptor REDES transferred from the descriptor read/write portion 120, the secondary initialization of the USB device is completed. That is, the USB device of the invention is able to communicate with the USB host 1. In this case, by the secondary initialization, the initialization of the USB device is completed.

As described above, since the USB device is initialized with the real descriptor REDES provided from the USB host 1, the USB device does not require an additional memory positioned at outside of the USB interface 100. Therefore, the size and the manufacturing cost of the USB device according to the invention can be reduced.

Figure 4:
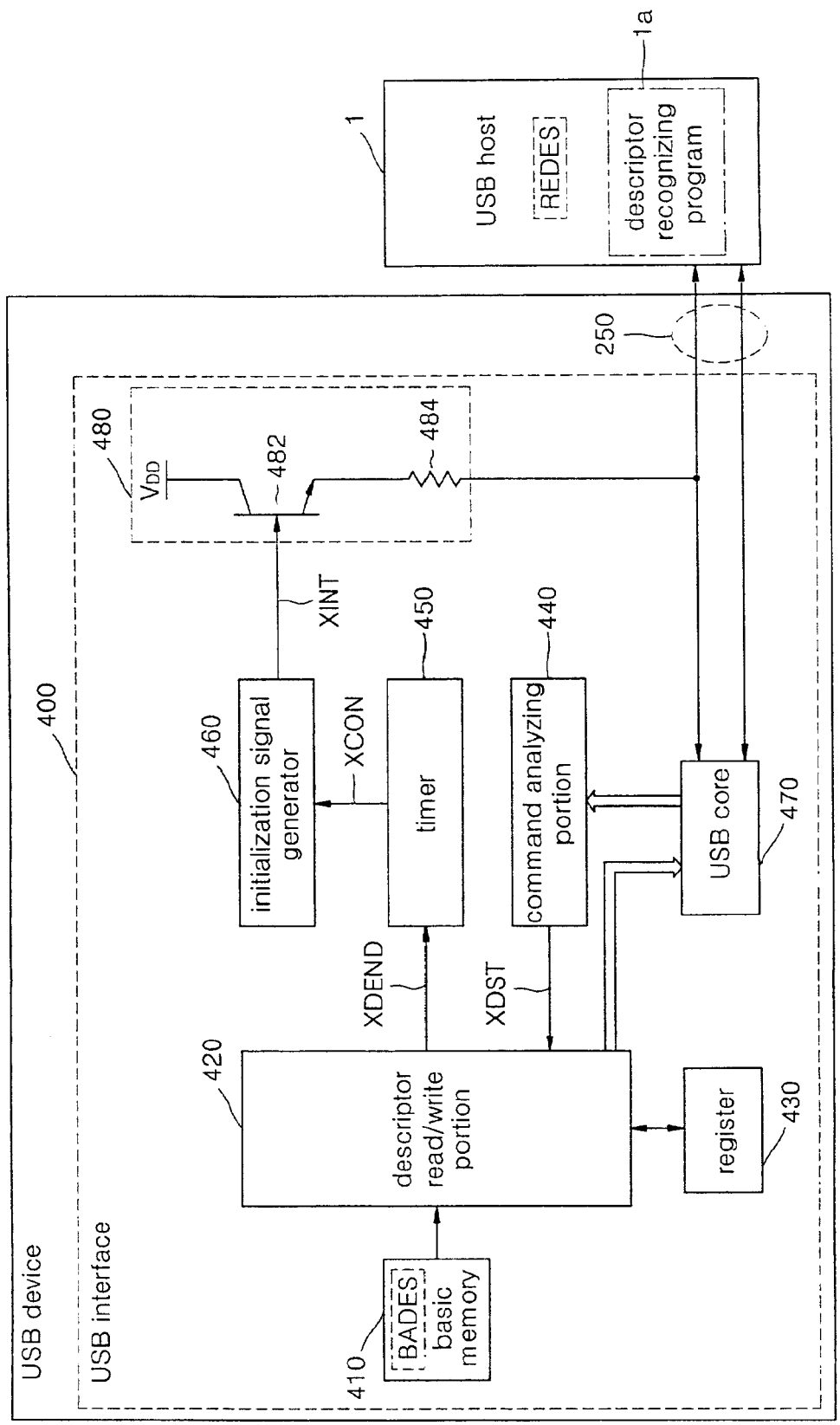
FIG. 4 is a block diagram of a USB device according to another exemplary embodiment of the invention.

In the above embodiment, the voltage regulator 200 is separated from the USB interface 100. However, in a USB device according to another embodiment of the invention illustrated in FIG. 4, a voltage regulator 480 is a part of a USB interface 400. In this case, the voltage regulator 480 has a transistor 482 connected to a terminal voltage $V_{DD}$ and a resistor 484 positioned between the transistor 482 and a signal line 250, as above-mentioned embodiment. Therefore, an operation of the voltage regulator 480 is similar to that of the voltage regulator 200 as shown in FIG. 2. Further, the USB interface 400 according to another embodiment includes a basic memory 410, a descriptor read/write portion 420, a register 430, a command analyzing portion 440, a timer 450, an initialization signal generator 460 and a USB core 470. The elements of the USB interface 400, except the voltage generator 480, are similar to those of the USB interface 100 as shown in FIG. 2. Therefore, the detailed description of the USB device according to another embodiment is omitted in this specification.

As described above, according to the USB device and the method for initializing the USB device of the invention, an additional memory applied to the conventional USB device is not required. Therefore, the USB device of the invention can considerably reduce the size and the manufacturing cost, as compared with the conventional USB device.

While this invention has been particularly shown and described with reference to exemplary embodiments thereof, it will be understood by those skilled in the art that various changes and equivalents may be made without departing from the spirit and scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. A universal serial bus device to be initialized as a state enabling a communication with a host, the host storing a real descriptor and a descriptor recognizing program, comprising:

an interface storing a predetermined basic descriptor, the interface primarily activating an initialization signal and transferring the basic descriptor to the host to perform a primary initialization, the interface downloading the real descriptor in response to a download command generated from the host, and secondarily activating the initialization signal and transferring the real descriptor to the host to perform a secondary initialization;

at least one signal line for guiding the basic descriptor, the real descriptor and the download command, the at least one signal line being enabled with a terminal voltage;

a voltage regulator providing the terminal voltage to the signal line while the initialization signal is activated;

a memory storing the basic descriptor;

a register for storing the real descriptor generated from the host;

a command analyzing portion receiving the real descriptor and the download command from the host and generating a download start signal; and a descriptor read/write portion transferring the basic descriptor stored in the memory to the host, the descriptor read/write portion transferring the real descriptor outputted from the command analyzing portion to the register in response to the download start signal and generating a download completion signal and providing the real descriptor stored in the register to the host.

2. The universal serial bus device in accordance with claim 1, wherein the interface further comprises:

a timer activating a control signal for controlling the activation of the initialization signal in response to the download completion signal; and an initialization signal generator activating the initialization signal in response to the control signal.

3. The universal serial bus device in accordance with claim 2, wherein the control signal is primarily activated to terminate a primary activation of the initialization signal and is secondarily activated to generate a secondary activation of the initialization signal.

4. The universal serial bus device in accordance with claim 1, wherein the memory is a read only memory (ROM).

5. The universal serial bus device in accordance with claim 1, wherein the voltage regulator comprises:

a transistor connected to a predetermined terminal voltage; and a resistor being disposed between the transistor and the signal line.

6. The universal serial bus device in accordance with claim 2, wherein the voltage regulator comprises:

a transistor connected to a predetermined terminal voltage; and a resistor being disposed between the transistor and the signal line.

7. The universal serial bus device in accordance with claim 6, wherein the transistor is controlled by the initialization signal generator.

8. A universal serial bus device to be initialized as a state enabling a communication with a host, the host storing a real descriptor and a descriptor recognizing program, comprising:

at least one signal line, connected to the host, for guiding data and commands, the at least one signal line being enabled with a terminal voltage;

an interface storing a predetermined basic descriptor, the interface primarily activating an initialization signal and transferring the basic descriptor to the host to perform a primary initialization, the interface downloading the real descriptor in response to a download command generated from the host, and secondarily activating the initialization signal and transferring the real descriptor to the host to perform a secondary initialization, the interface including a voltage regulator providing the terminal voltage to the signal line while the initialization signal is activated;

a memory storing the basic descriptor;

a register for storing the real descriptor generated from the host;

a command analyzing portion receiving the real descriptor and the download command from the host and generating a download start signal; and a descriptor read/write portion transferring the basic descriptor stored in the memory to the host, the descriptor read/write portion transferring the real descriptor outputted from the command analyzing portion to the register in response to the download start signal and generating a download completion signal and providing the real descriptor stored in the register to the host.

9. The universal serial bus device in accordance with claim 8, wherein the interface further comprises:

a timer activating a control signal for controlling the activation of the initialization signal in response to the download completion signal; and an initialization signal generator activating the initialization signal in response to the control signal.

10. The universal serial bus device in accordance with claim 9, wherein the control signal is primarily activated to terminate a primary activation of the initialization signal and is secondarily activated to generate a secondary activation of the initialization signal.

11. The universal serial bus device in accordance with claim 8, wherein the memory is a read only memory (ROM).

12. The universal serial bus device in accordance with claim 8, wherein the voltage regulator comprises:

a transistor connected to a predetermined terminal voltage; and a resistor being disposed between the transistor and the signal line.

13. The universal serial bus device in accordance with claim 9, wherein the voltage regulator comprises:

a transistor connected to a predetermined terminal voltage; and a resistor being disposed between the transistor and the signal line.

14. The universal serial bus device in accordance with claim 13, wherein the transistor is controlled by the initialization signal generator.

* * * * *